US011519479B2

(12) United States Patent
Krause et al.

(10) Patent No.: US 11,519,479 B2
(45) Date of Patent: Dec. 6, 2022

(54) METHOD FOR MANUFACTURING A CENTRIFUGAL PENDULUM, AND CENTRIFUGAL PENDULUM

(71) Applicant: Schaeffler Technologies AG & Co. KG, Herzogenaurach (DE)

(72) Inventors: Thorsten Krause, Bühl (DE); Lothar Moser, Ottersweier (DE); Hubert Friedmann, Sinzheim (DE); Christian Hügel, Rheinau (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 785 days.

(21) Appl. No.: 16/347,214

(22) PCT Filed: Oct. 17, 2017

(86) PCT No.: PCT/DE2017/100887
§ 371 (c)(1),
(2) Date: May 3, 2019

(87) PCT Pub. No.: WO2018/086651
PCT Pub. Date: May 17, 2018

(65) Prior Publication Data
US 2019/0271376 A1    Sep. 5, 2019

(30) Foreign Application Priority Data

Nov. 9, 2016  (DE) .......................... 102016221920.0
May 2, 2017  (DE) .......................... 102017109324.9

(51) Int. Cl.
*F16F 15/14*    (2006.01)
*B21D 28/26*    (2006.01)
*F16F 15/12*    (2006.01)

(52) U.S. Cl.
CPC ............ *F16F 15/145* (2013.01); *B21D 28/26* (2013.01); *F16F 15/1203* (2013.01)

(58) Field of Classification Search
None
See application file for complete search history.

(56) References Cited

U.S. PATENT DOCUMENTS 5,862,579 A  *  1/1999  Blumberg .............. B21D 28/06
                                                     402/14
2015/0362041 A1    12/2015  Lee et al.

FOREIGN PATENT DOCUMENTS

| CN | 103492749 A    | 1/2014  |
| DE | 102009021355 A1 | 12/2009 |
| DE | 102009042812 A1 | 5/2010  |
| DE | 102012212895 A1 | 2/2013  |
| DE | 102012213124 A1 | 2/2013  |

(Continued)

*Primary Examiner* — Vicky A Johnson

(57) ABSTRACT

The invention relates to a method for manufacturing a centrifugal pendulum (1) as well as a centrifugal pendulum (1) which is manufactured using said method and which comprises pendulum components (13, 14) made of sheet metal, i.e. a pendulum mass support (2) that is arranged about an axis of rotation (d), and pendulum masses (3) that are distributed about the circumference. In order to reduce tool costs and the cost per item, at least one punched blank (9) comprising at least two pendulum components (13, 14) is manufactured, whereupon the pendulum components (13, 14) are separated from one another.

20 Claims, 2 Drawing Sheets

(56) References Cited

FOREIGN PATENT DOCUMENTS

| | | | |
|---|---|---|---|
| DE | 102013214829 A1 | 2/2014 | |
| DE | 102014113021 A1 | 3/2015 | |
| EP | 3061989 A1 | 8/2016 | |
| FR | 3010468 A1 * | 3/2015 | ............ F16F 15/145 |
| WO | 2014082629 A1 | 6/2014 | |

* cited by examiner

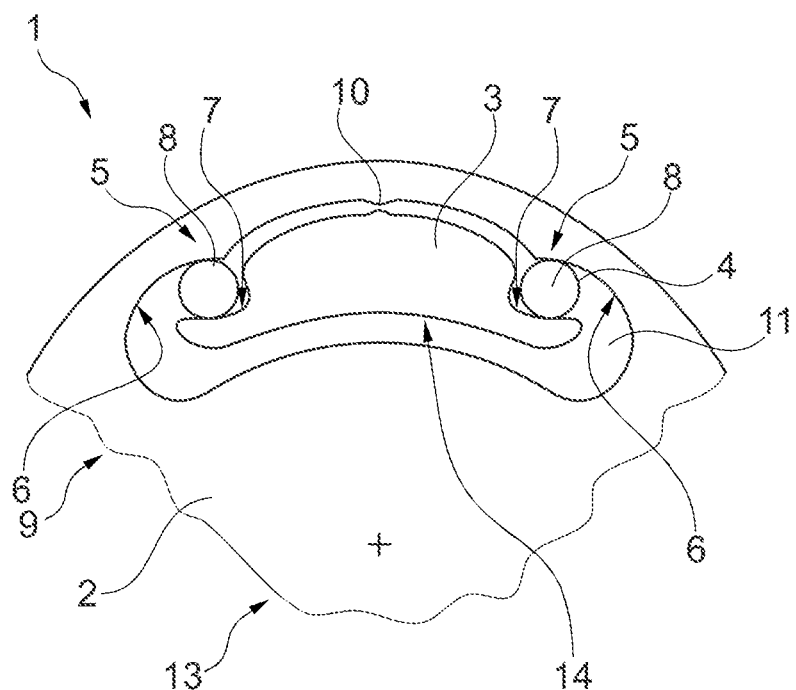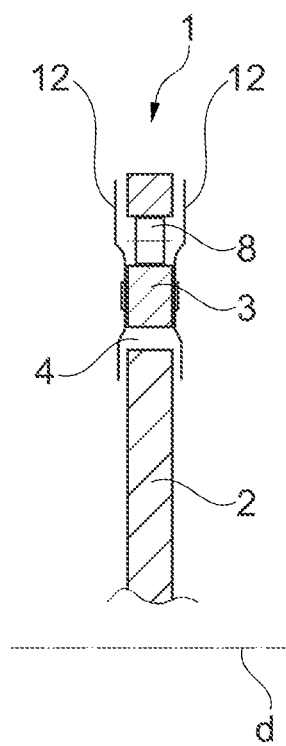
Fig. 1  Fig. 2
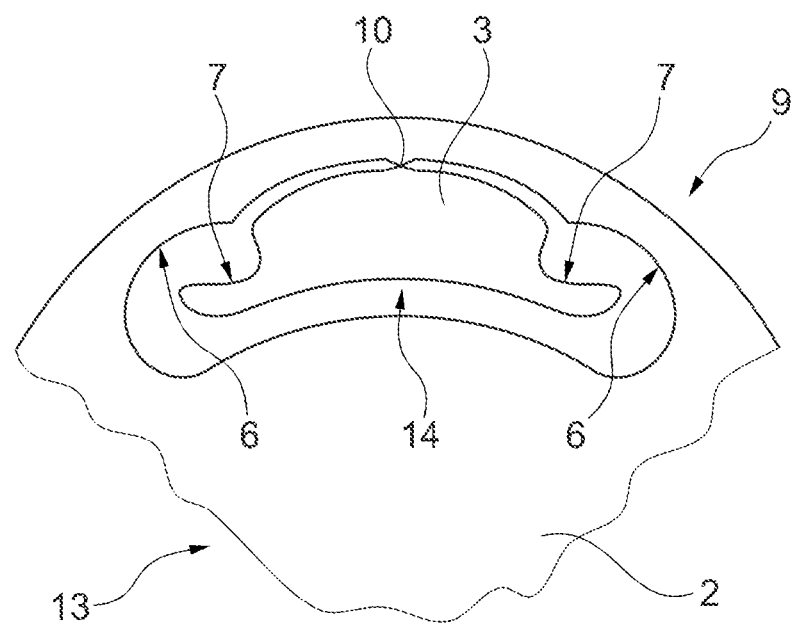
Fig. 3

METHOD FOR MANUFACTURING A CENTRIFUGAL PENDULUM, AND CENTRIFUGAL PENDULUM

CROSS-REFERENCE TO RELATED APPLICATIONS

This application is the U.S. National Phase of PCT Appln. No. PCT/DE2017/100887 filed Oct. 17, 2017, which claims priority to DE 10 2016 221 920.0 filed Nov. 9, 2016 and DE 10 2017 109 324.9 filed May 2, 2017, the entire disclosures of which are incorporated by reference herein.

TECHNICAL FIELD

The present disclosure relates to a method for manufacturing a centrifugal pendulum and to a centrifugal pendulum produced by means of this method and having a pendulum mass support, which is arranged about an axis of rotation, and pendulum masses, which are arranged distributed over the circumference in such a way that they can perform a pendulum motion.

BACKGROUND

Centrifugal pendulums are used for torsional vibration isolation especially in drive trains of motor vehicles having an internal combustion engine in which rotation takes place. For this purpose, the centrifugal pendulum has a pendulum mass support, which is arranged in such a way as to be rotatable about an axis of rotation, e.g. the axis of rotation of the crankshaft of the internal combustion engine, and on which pendulum masses distributed over the circumference are mounted by means of pendulum bearings in such a way that they can perform a pendulum motion. In the case of rotating pendulum mass supports, the pendulum masses are accelerated radially outward and can be moved on a predetermined pendulum path by means of the pendulum bearings, enabling them to move counter to the action of the centrifugal force on relatively small radii when torsional vibrations occur and hence absorbing the torsional vibrations in a speed-adapted manner.

A typical arrangement of the pendulum masses on a pendulum mass support is known from DE 10 2009 021 355 A1. In this case, pendulum mass parts are arranged on both sides of the pendulum mass support, said parts being connected by means of connection means passing through the pendulum mass support at apertures to form pendulum masses. Mounting of the pendulum masses on the pendulum mass support in such a way that they can perform a pendulum motion is accomplished by means of in each case two pendulum bearings, which are spaced apart in the circumferential direction and are formed by axially adjacently arranged races in the pendulum mass parts and in the pendulum mass support, wherein a pendulum roller passing through apertures having the races rolls on the races. It is furthermore possible—as is known, for example, from WO2014/082629 A1 for pendulum masses distributed over the circumference to be arranged axially between two side parts forming the pendulum mass support.

DE 10 2009 042 812 A1 discloses a centrifugal pendulum which is integrated into a dual mass flywheel and which, inter alia, discloses pendulum masses accommodated in cutouts in a pendulum mass support, wherein mounting of the pendulum masses is accomplished by means of pendulum rollers, which roll on races, arranged radially one above the other, of the pendulum masses and of the pendulum mass support, the pendulum masses thus being accommodated in the installation space of the pendulum mass support. If the axial extent of the pendulum masses is limited to the thickness of the pendulum mass support in this case, the mass of the pendulum mass is not very effective for absorbing torsional vibrations.

DE 10 2013 214 829 A1 shows a centrifugal pendulum having pendulum masses which are accommodated in apertures of the pendulum mass support and have pendulum bearings with races arranged radially one above the other. The pendulum masses are supported axially by means of holding plates, which are arranged either on the pendulum mass support or on the pendulum masses. The holding plates, if these are even secured on the pendulum mass, do not contribute significantly to the mass of the pendulum mass.

SUMMARY

The proposed centrifugal pendulums are preferably manufactured by means of punching and, if appropriate, punching and forming methods. In these processes, the pendulum mass support and the pendulum masses are as far as possible manufactured while limiting punching waste and with reduced expenditure on tooling by manufacturing several pendulum masses in loose form from a sheet-metal blank by means of a punching tool, for example.

It is an object of the present disclosure to further develop a method for manufacturing a centrifugal pendulum, in which tool and unit costs are reduced. It is furthermore an object of the present disclosure to propose a low-cost centrifugal pendulum. It is furthermore an object of the present disclosure to enable a method for hardening the pendulum masses and/or the pendulum mass support to be carried out more simply.

The method proposed is used to manufacture a centrifugal pendulum comprising pendulum components made of sheet metal. The pendulum components are manufactured by a punching/forming method from sheet-metal strips, referred to as coils, of rolled-up sheet-metal in a single- or multi-stage punching and forming process, for example. The pendulum components, possibly together with further sheet-metal parts, form a pendulum mass support, which is arranged around an axis of rotation, and pendulum masses, which are arranged on the pendulum mass support in a manner distributed over the circumference and mounted on it in such a way that they can perform a pendulum motion. The centrifugal pendulum can have a pendulum mass support designed as a pendulum flange with laterally arranged pendulum masses. As an alternative, the pendulum mass support can be formed by two spaced side parts, which are formed to accommodate the pendulum masses between them. As an alternative, the pendulum mass support can be designed as a pendulum flange with apertures, wherein the pendulum masses are accommodated in the apertures in the plane of the pendulum flange. In this case, the pendulum masses have substantially the same thickness as the pendulum mass support, and therefore particularly narrow centrifugal pendulums can be proposed.

The method is carried out in such a way that at least one punched blank having at least two of the pendulum components is manufactured and the pendulum components are then separated. A blank containing the pendulum mass supports and the pendulum masses can be manufactured from sheet metal, for example. In this case, the pendulum masses are accommodated directly in the apertures, the size of which is dimensioned in such a way that the pendulum masses can be moved along a predetermined oscillation angle of the pendulum mass support. Thus, only the areas required for the oscillation angle are punched out of the blank, and therefore the pendulum masses are already contained in the apertures of the pendulum mass support. It is thereby possible to manufacture the pendulum mass support and the pendulum masses by means of a single punching tool. As a result of this and as a result of the reduced punching waste, a particularly advantageous centrifugal pendulum can be manufactured.

It has proven particularly advantageous here if the blank is designed in such a way that the pendulum mass support and the pendulum masses are formed integrally, thus ensuring that the pendulum masses are fixed accurately in position in the apertures, at least until assembly of the centrifugal pendulum. At a predetermined point in time, the pendulum mass support and the pendulum masses are then separated in order to ensure the functioning of the centrifugal pendulum in the manner envisaged.

In an alternative embodiment of the method, it is possible for only a plurality of pendulum masses to be manufactured in integrally connected form in a common blank and then to be separated. The pendulum masses can be connected to one another directly by means of one or more predetermined breaking points, for example.

As an alternative, a support part, on which the pendulum masses are mounted by means of predetermined breaking points, can be provided. It is possible, for example, to provide a support part, by means of which some or all of the pendulum masses are connected by means of at least one predetermined breaking point. It is possible, for example, to provide an annular support part, on the inner circumference of which pendulum masses are mounted in a manner distributed over the circumference by means of at least one predetermined breaking point, preferably two predetermined breaking points spaced apart in the circumferential direction. As an alternative, it is possible to provide a support part, on the outer circumference of which at least two radially opposite pendulum masses or more than two pendulum masses arranged distributed over the circumference are mounted by means of at least one predetermined breaking point.

According to another alternative embodiment of the method, a blank can be provided with a support part on which at least two pendulum masses are mounted at at least one circumferential end by means of a predetermined breaking point. The pendulum masses can each be arranged in the same plane and in the same alignment in a manner layered one above the other and can each be connected at their circumferential ends to the respective support part by means of a predetermined breaking point, for example.

The manufacture of the blank can be accomplished by means of a punching method, if appropriate with the inclusion of forming steps, e.g. to produce stamped features to avoid burrs or the like. In this case, it is possible in each case for at least one predetermined breaking point to be provided between the pendulum mass support and the pendulum masses or between a plurality of pendulum masses or between a support part and the pendulum masses. The predetermined breaking point can be achieved, for example, by weakening the material, e.g. by stamping. If the intention is, depending on the flat shape predetermined by the sheet-metal blank, to provide pendulum mass supports and/or pendulum masses with a shape that deviates from the flat configuration, it is possible, for example, to envisage a punching and forming method in order, for example, to adapt the pendulum flange axially to predetermined designs of an installation situation, to form a flange or the like thereon, to raise tabs or the like and/or to stamp on functional elements, such as riveting bosses or the like. For example, the pendulum masses can be produced by forming, e.g. transverse extrusion or folding over material of the free spaces of the apertures or the like, thereby increasing the axial thickness of the pendulum masses to increase the mass.

By virtue of the fact that the blank is only subsequently separated into the pendulum mass support and the pendulum masses or into the individual pendulum masses, said blank can be hardened as a whole. This means that, after punching, the blank is hardened as a whole, being surface hardened for example, after which separation takes place. Further processing steps, e.g. coating, painting, polishing and/or the like can be carried out on the blank as a whole.

Races are provided on the pendulum mass support and on the pendulum masses, preferably as off-tool features. In combination with pendulum rollers rolling on said races, the races each form a pendulum bearing. For the formation of bifilar suspension of the pendulum masses arranged so as to move pendulum-fashion in a pendulum plane perpendicular to the axis of rotation in the centrifugal force field of the rotating pendulum mass support, it has proven advantageous to form each pendulum mass by means of two pendulum bearings spaced apart in the circumferential direction. In one illustrative embodiment of the centrifugal pendulum, the radially outer races of the pendulum mass support here lie substantially opposite the radially inner races of the pendulum mass of one pendulum bearing in each case. In further illustrative embodiments, the pendulum masses are each arranged spaced apart axially from the pendulum mass support, and the pendulum rollers extend beyond the races of the pendulum mass support and of the pendulum masses axially and support these, forming a three-point bearing consisting of two side parts forming the pendulum mass support and of a pendulum mass or of a pendulum flange and two pendulum masses arranged on both sides thereon, against the effective centrifugal force. A predetermined breaking point can preferably be provided centrally between the pendulum bearings in the circumferential direction. As an alternative, a plurality of predetermined breaking points, distributed over the circumference, for each pendulum mass can be provided on the inner circumference, on the outer circumference and/or on the lateral surfaces, such as the circumferential ends of the pendulum masses and, if appropriate, opposite positions of the pendulum mass support.

The free spaces between the races of a pendulum bearing can be designed in such a way that the pendulum rollers can be fitted before the separation of the pendulum mass support and the pendulum masses. The at least one predetermined breaking point between the pendulum masses and the pendulum mass support can be provided during the fitting of the pendulum rollers. Any burrs or projections that may interfere can be removed by machining, by means of a laser or in some other way. As an alternative, provision can be made for the free spaces between the races of the pendulum mass support and the pendulum masses to be made smaller in respect of their diameter than the diameter of the pendulum rollers and for the pendulum rollers to be inserted only after the separation of the pendulum mass support and the pendulum masses.

According to an advantageous embodiment of the method, the fitting of lateral disks which prevent the pendulum rollers from falling out can be provided after the insertion of the pendulum rollers onto the races to form a pendulum bearing. The lateral disks can be attached to the pendulum masses and can thus additionally serve to increase the mass of the pendulum masses. As an alternative, the lateral disks can be arranged on the pendulum mass support. In this arrangement, the lateral disks overlap at least some of the pendulum rollers radially.

The proposed centrifugal pendulum manufactured by means of the proposed method comprises a pendulum mass support, which is arranged in such a way as to be rotatable about an axis of rotation, and at least two, e.g. two to six, pendulum masses, which are arranged distributed over the circumference and are mounted on the pendulum mass support by means of pendulum bearings in such a way that they can perform a pendulum motion along a pendulum path in a pendulum plane perpendicular to the axis of rotation.

In an advantageous embodiment, each pendulum mass of the proposed centrifugal pendulum has two pendulum bearings spaced apart in the circumferential direction, with the result that the pendulums are equivalent in respect of their pendulum path to a pendulum with bifilar suspension in the centrifugal force field of the pendulum mass support rotating about the axis of rotation. By means of appropriate design of the races, a pendulum motion of a pendulum with pendulum filaments arranged in parallel or in a trapezium shape or a free form of the pendulum motion can be provided. Between the pendulum bearings in the circumferential direction, a predetermined breaking point can be arranged, preferably radially on the outside, between the pendulum masses and the pendulum mass support.

The pendulum masses, which are accommodated in the apertures by means of corresponding material cutouts, punched-out sections and the like or are arranged in a manner spaced apart axially from the pendulum mass support can have their final shape off-tool.

BRIEF DESCRIPTION OF THE DRAWINGS

The present disclosure is explained in greater detail by means of the illustrative embodiments shown in FIGS. 1 to 6. In the drawing:

FIG. 1 shows a partial view of a centrifugal pendulum,
FIG. 2 shows the upper part of the centrifugal pendulum of FIG. 1 arranged around an axis of rotation, in section,
FIG. 3 shows a partial view of a blank for the manufacture of the centrifugal pendulum of FIGS. 1 and 2.

DETAILED DESCRIPTION

Figure 4:
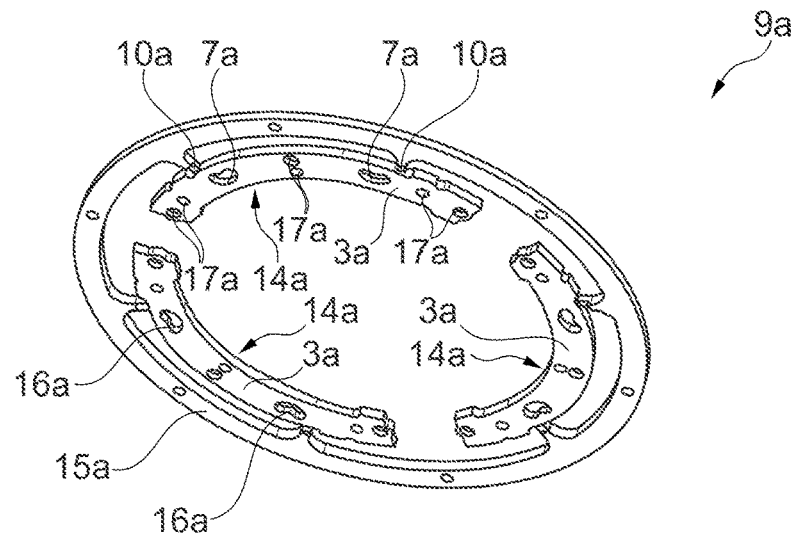
FIG. 4 shows a blank with pendulum masses arranged over the circumference.

FIG. 1 shows the centrifugal pendulum 1 in a schematic partial view. The centrifugal pendulum 1 comprises the pendulum mass support 2, which is arranged in such a way as to be rotatable about an axis of rotation, is integrated into a dual mass flywheel, a clutch disk, a hydrodynamic torque converter or some other device in a drive train of a motor vehicle, for example, and is arranged in such a way as to be rotatable with the crankshaft of an internal combustion engine or of a transmission input shaft of a transmission, said pendulum mass support being designed as the first pendulum component 13, which is produced from sheet metal. The pendulum mass support 2 contains apertures 4, which in this case are closed for example, corresponding to the number of pendulum masses 3 arranged distributed over the circumference, which are designed as the second pendulum components 14, produced from sheet metal, in each of which apertures one pendulum mass 3 is arranged. The pendulum masses 3 are mounted by means of pendulum bearings 5, spaced apart in the circumferential direction, in such a way that they can perform a pendulum motion relative to the pendulum mass support 2. The direction of the pendulum motion of the pendulum masses 3 is in a pendulum plane perpendicular to the axis of rotation, with the result that, when the pendulum mass support 2 rotates about the axis of rotation, the pendulum masses 3 are accelerated radially outward and change their radial position along a predetermined pendulum path depending on torsional vibrations and thus exert an absorbing effect on the torsional vibrations. The pendulum path of the pendulum masses 3 is predetermined by the shape of the races 6, 7 of the pendulum bearings 5, said races being arranged radially one above the other. The pendulum roller 8 rolls on the races 6, 7.

In order to lower the unit costs and tool costs for the centrifugal pendulum 1, the pendulum mass support 2 and the pendulum masses 3 are manufactured in one piece as a blank 9. For this purpose, only the free spaces 11 of the apertures 4 which remain between the pendulum masses 3 and the pendulum mass support 2 are punched out by means of a punching tool, and the pendulum mass support 2 and the pendulum mass 3 are in each case connected by means of the predetermined breaking point 10. Before or after the fitting of the pendulum rollers 8, the predetermined breaking point 10, which has already been separated in the operating state shown, is parted.

FIG. 2 shows the upper part of the centrifugal pendulum 1 of FIG. 1, which is arranged in such a way as to be rotatable around the axis of rotation d, in section and in a schematic illustration. The pendulum mass 3 is accommodated in the aperture 4 of the pendulum support 2 in a manner supported in a radially outward direction on the pendulum mass support by means of the pendulum roller 8 under the action of centrifugal force. To secure the pendulum roller 8 against loss and to center the pendulum mass 3 relative to the pendulum mass support 2, the lateral disks 12 are mounted, e.g. riveted, on both sides on the pendulum mass 3, said disks being manufactured from thin sheet metal or plastic, for example. The lateral disks 12, which are not illustrated in FIG. 1, overlap the pendulum mass support 2 radially and, apart from the supporting and loss prevention function, additionally serve to increase the mass of the pendulum masses 3. In further illustrative embodiments of the centrifugal pendulum 1, the lateral disks can be mounted on the pendulum mass support and radially overlap at least some of the pendulum rollers 8.

FIG. 3 shows the blank 9 in a partial view before it is mounted in the centrifugal pendulum 1 of FIGS. 1 and 2. After the punching process, the pendulum components 13, 14 in the form of pendulum masses 3 are connected integrally to the pendulum mass support 2 by means of the predetermined breaking point 10. In the illustrative embodiment shown, the predetermined breaking point 10 is arranged between the races 6, 7 of the pendulum bearings 5, when viewed in the circumferential direction (FIG. 1). In further illustrative embodiments, one or more predetermined breaking points and/or one or more predetermined breaking points at different positions between the pendulum masses 3 and the pendulum mass support 2 can be provided. The races 6, 7 are preferably produced as off-tool features in the punching process. A rolling operation on the pendulum rollers 8 (FIGS. 1 and 2) can be avoided in the region of any punch exit burr that may be present on the races if the pendulum rollers 8 have corresponding offsets or are designed to be asymmetrical in some other way. Axial support and thus axial positioning of the pendulum rollers 8 can be provided in a corresponding manner by means of the lateral disks 12 (FIG. 2).

Figure 5:
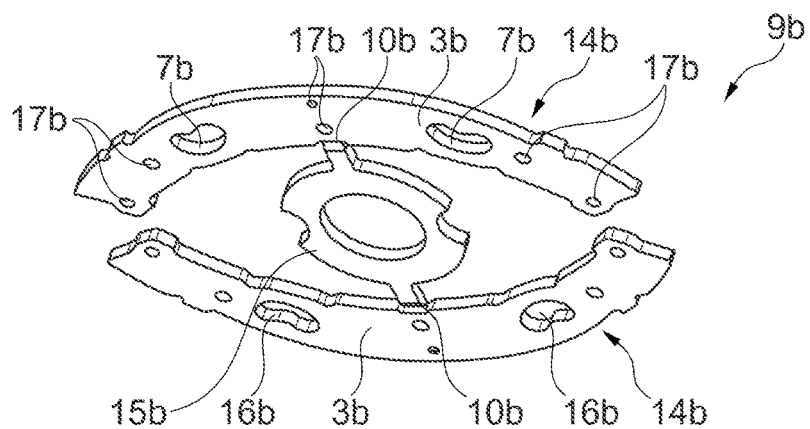
FIG. 5 shows a blank with opposite pendulum masses.
Figure 6:
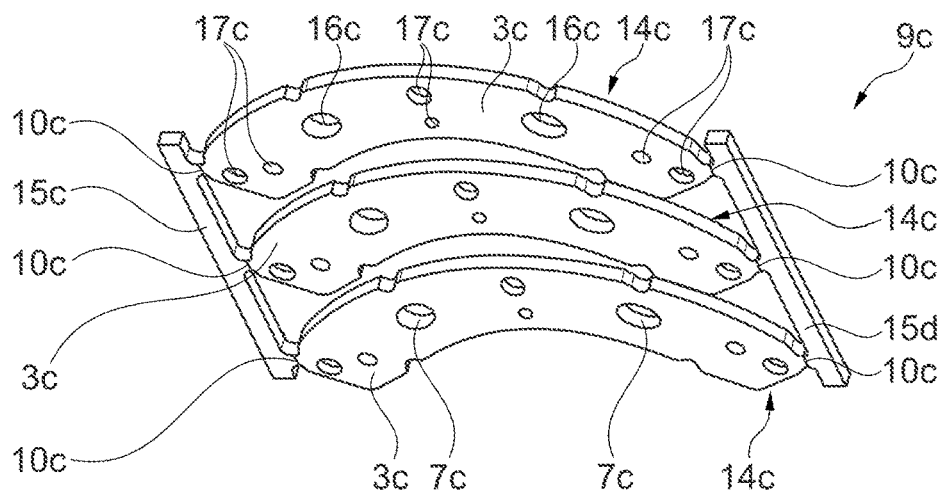
FIG. 6 shows a blank with pendulum masses arranged one above the other.

FIGS. 4 to 6 each show 3-D views of blanks 9a, 9b, 9c, on which pendulum components 14a, 14b, 14c, each designed exclusively as pendulum masses 3a, 3b, 3c, are connected integrally to one another by means of the predetermined breaking points 10a, 10b, 10c. Here, the pendulum masses 3a, 3b, 3c are each connected to support parts 15a, 15b, 15c, 15d at the predetermined breaking points 10a, 10b, 10c and are separated, following hardening performed after punching for example, at the predetermined breaking points 10a, 10b, 10c. All the pendulum masses 3a, 3b, 3c of a centrifugal pendulum are advantageously mounted on the blanks 9a, 9b, 9c, respectively. It is also possible for just some of the pendulum masses 3a, 3b, 3c or for a higher number of pendulum masses 3a, 3b, 3c, e.g. for two centrifugal pendulums, to be mounted on one blank 9a, 9b, 9c. For centrifugal pendulums that differ from the centrifugal pendulum 1 in FIG. 1, the pendulum masses 3a, 3b, 3c are provided with pendulum masses 3a, 3b, 3c which are arranged between two axially spaced side parts forming the pendulum mass supports or with pendulum masses arranged on both sides of a pendulum flange. For this purpose, the apertures 16a, 16b, 16c are preferably formed as off-tool features with the races 7a, 7b, 7b. In the case of pendulum masses 3a, 3b, 3c which are provided for arrangement on both sides of a pendulum flange and are connected to one another by spacer pins—as illustrated in the illustrative embodiments shown—the openings 17a, 17b, 17c for the spacer pins are likewise preferably punched out as off-tool features. In the same way, corresponding openings can be provided for multiple layered pendulum mass parts riveted together, which can be provided integrally in the same way in a blank corresponding to the blanks 9a, 9b, 9c.

FIG. 4 shows the illustrative embodiment of a blank 9a with the support part 15a designed as an annular part. Three pendulum masses 3a arranged distributed over the circumference are each arranged on the inner circumference of the support part 15a by means of two predetermined breaking points 10a spaced apart in the circumferential direction. To better utilize the radially inner installation space of the blank 9a, pendulum masses can be arranged on several diameters, if appropriate in a manner offset relative to one another in the circumferential direction.

FIG. 5 shows an illustrative embodiment of a blank 9b, on which two mutually opposite pendulum masses are connected in a separable manner to one another at the predetermined breaking points 10b by means of an inner support part 15b. To better utilize the radially inner installation space of the blank 9a of FIG. 4, the blank 9b of FIG. 5 can be accommodated in the internal space of the blank 9a of FIG. 4, for example, wherein the radially opposite pendulum masses 3a, 3b are each connected separably to one another by means of predetermined breaking points.

FIG. 6 shows an illustrative embodiment of a blank 9c, on which a plurality of pendulum masses 3c—in this case three such masses—are arranged in one plane in a manner layered one above the other while maintaining a gap. The pendulum masses 3c are connected to the two support parts 15c, 15d by means of the predetermined breaking points 10c, which are each arranged at the circumferential ends of said masses.

LIST OF REFERENCE SIGNS 1 centrifugal pendulum
2 pendulum mass support
3 pendulum mass
3a pendulum mass
3b pendulum mass
3c pendulum mass
4 aperture
5 pendulum bearing
6 race
7 race
7a race
7b race
7c race
8 pendulum roller
9 blank
9a blank
9b blank
9c blank
10 predetermined breaking point
10a predetermined breaking point
10b predetermined breaking point
10c predetermined breaking point
11 free space
12 lateral disk
13 pendulum component
14 pendulum component
14a pendulum component
14b pendulum component
14c pendulum component
15a support part
15b support part
15c support part
15d support part
16a aperture
16b aperture
16c aperture
17a opening
17b opening
17c opening
d axis of rotation

The invention claimed is:

1. A method for manufacturing a centrifugal pendulum having pendulum components made of sheet metal, namely a pendulum mass support, which is arranged about an axis of rotation, and pendulum masses, which are arranged distributed over a circumference of said support in such a way that the pendulum masses can perform a pendulum motion, the method comprising: manufacturing at least one punched blank having at least two of the pendulum components, wherein at least one predetermined breaking point is provided between the pendulum components, and separating the pendulum components from one another at the at least one predetermined breaking point.

2. The method as claimed in claim 1, wherein the blank is hardened as a whole and then separated into the pendulum components.

3. The method as claimed in claim 1, wherein the pendulum mass support has apertures, in which the pendulum masses are accommodated, wherein the at least one predetermined breaking point is provided between a respective pendulum mass and the pendulum mass support.

4. The method as claimed in claim 1, wherein, during assembly of the centrifugal pendulum, pendulum rollers, which roll on races, are inserted between the pendulum masses and the pendulum mass support before, during or after a breakage of the at least one predetermined breaking point.

5. The method as claimed in claim 4, wherein, after inserting the pendulum rollers into the races, lateral disks, which at least partially overlap at least the pendulum rollers radially, are mounted on the pendulum masses or on the pendulum mass support.

6. The method as claimed in claim 1, wherein the blank is provided with a support part, on an inside or an outside of which at least two pendulum masses are arranged distributed over the circumference.

7. The method as claimed in claim 1, wherein the blank is provided with at least one support part, on which at least two pendulum masses are mounted at at least one circumferential end by a predetermined breaking point.

8. The method as claimed in claim 1, wherein races provided for forming pendulum bearings between the pendulum mass support and the pendulum masses are formed off-tool on the pendulum components during manufacture of the blank.

9. A method for manufacturing a centrifugal pendulum, comprising:
forming a pendulum mass support and a pendulum mass from a blank, wherein the pendulum mass support includes an opening in which the pendulum mass is accommodated;
punching out an area of the blank that remains between the pendulum mass support and the pendulum mass such that the pendulum mass support is only connected to the pendulum mass at a predetermined breaking point; and
separating the pendulum mass support from the pendulum mass at the predetermined breaking point.

10. The method of claim 9, further comprising:
hardening the pendulum mass support and the pendulum mass prior to separating the pendulum mass support from the pendulum mass.

11. The method of claim 9, further comprising:
inserting pendulum rollers between the pendulum mass and the pendulum mass support.

12. The method of claim 11, further comprising:
mounting lateral disks on axially opposite sides of the centrifugal pendulum, wherein the lateral disks arranged to prevent displacement of the pendulum rollers.

13. The method of claim 12, wherein the lateral disks are attached to the pendulum mass.

14. The method of claim 12, wherein the lateral disks are attached to the pendulum mass support and extend in a radial direction such that the lateral disks at least partially overlap the pendulum rollers.

15. A method for manufacturing a centrifugal pendulum having pendulum components made of sheet metal, namely a pendulum mass support, which is arranged about an axis of rotation, and pendulum masses, which are arranged distributed over a circumference of said support in such a way that the pendulum masses can perform a pendulum motion, the method comprising: manufacturing at least one punched blank having at least two of the pendulum components, hardening the blank as a whole, and then separating the pendulum components from one another.

16. The method as claimed in claim 15, wherein the blank is provided with a support part, on an inside or an outside of which at least two pendulum masses are arranged distributed over the circumference.

17. The method as claimed in claim 15, wherein the blank is provided with at least one support part, on which at least two pendulum masses are mounted at at least one circumferential end by a predetermined breaking point.

18. The method as claimed in claim 15, wherein races provided for forming pendulum bearings between the pendulum mass support and the pendulum masses are formed off-tool on the pendulum components during manufacture of the blank.

19. The method as claimed in claim 15, wherein, during assembly of the centrifugal pendulum, pendulum rollers, which roll on races, are inserted between the pendulum masses and the pendulum mass support after hardening the blank.

20. The method as claimed in claim 19, wherein, after inserting the pendulum rollers into the races, lateral disks, which at least partially overlap at least the pendulum rollers radially, are mounted on the pendulum masses or on the pendulum mass support.

* * * * *